UNITED STATES PATENT OFFICE.

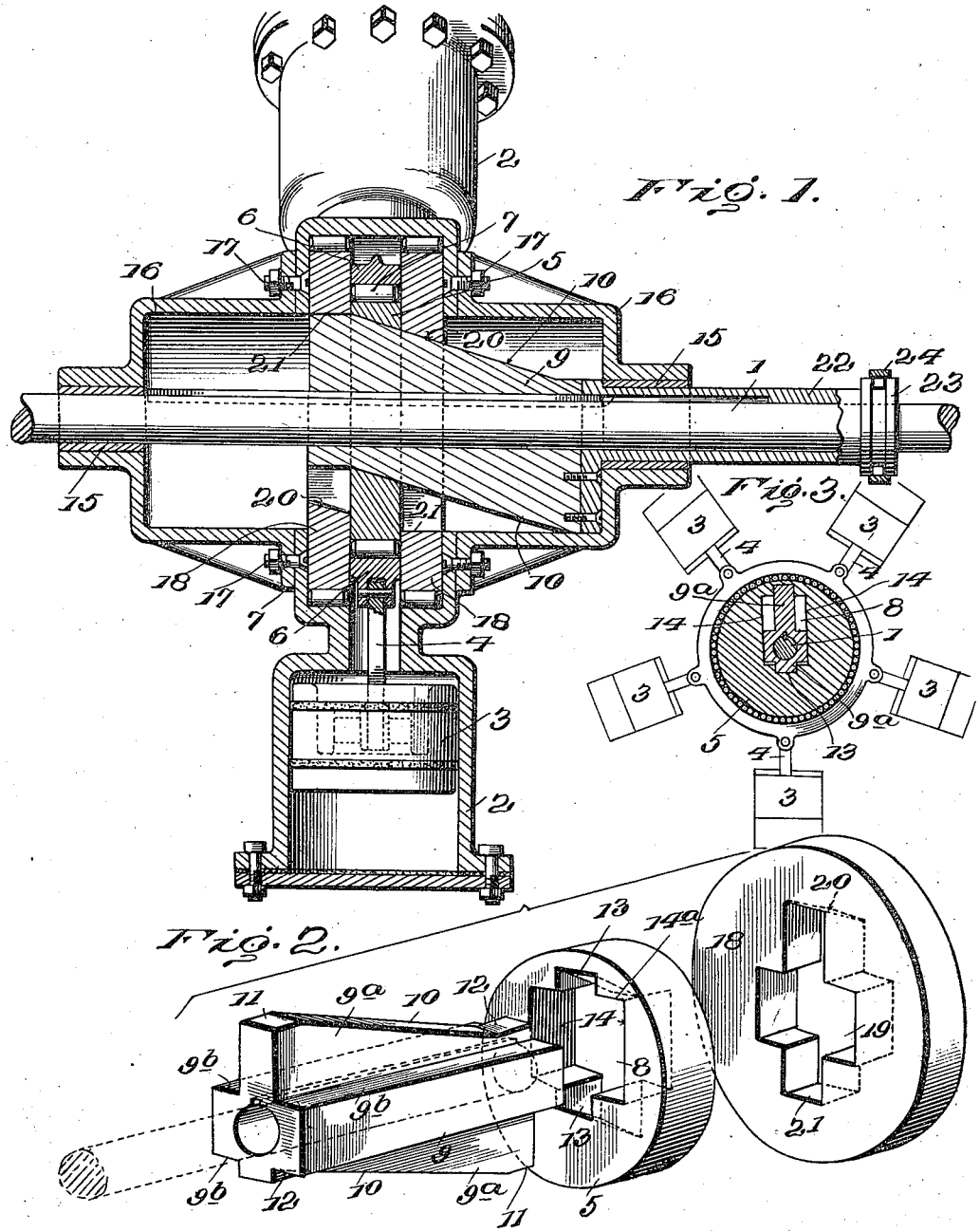

CHARLES CLAYTON RICH, OF MOUNT VERNON, NEW YORK, ASSIGNOR TO THE HYDRO-KINETIC TRANSMISSION CO., OF MOUNT VERNON, NEW YORK, A CORPORATION OF MAINE.

VARIABLE-ECCENTRIC MECHANISM.

1,191,230.  Specification of Letters Patent.  Patented July 18, 1916.

Application filed June 12, 1911. Serial No. 632,699.

*To all whom it may concern:*

Be it known that I, CHARLES CLAYTON RICH, citizen of the United States, residing at Mount Vernon, in the county of Westchester and State of New York, have invented certain new and useful Improvements in Variable-Eccentric Mechanism, of which the following is a specification.

This invention relates broadly to means for transforming rotary into reciprocating motion, and more particularly to mechanism whereby the extent of movement of the reciprocating part or parts may be varied relative to the rotary part, and whereby the movements of the reciprocating part or parts may be caused to cease, without affecting the movement of the rotary part.

More specifically considered, this present invention has to do with a variable eccentric and means for changing the "throw" or action of said eccentric, the invention being intended primarily for use in connection with automobiles, motor trucks, or other vehicles, or motor boats and other marine vessels of the type that employ what is known as hydraulic transmission mechanism, doing away with the use of gears and similar machine elements to transmit the motion from the drive to the driven shaft or axle, and employing in lieu thereof, either as a unit or as separate elements, a pump or pumps and a hydraulic motor or motors driven thereby.

In work of the type just above outlined, it has been proposed to provide by-passes in the pumps which may be opened, whenever it is desired to bring the vehicle to a standstill, or to permit it to remain motionless, or to "coast", while permitting the internal combustion engine or other prime mover to continue to run, but such method or mechanism has its manifest disadvantages in that the motive fluid is continuously circulated through the pumps and unnecessary work is thereby imposed upon the prime mover as well as the pump elements, while at the same time "slippage" or leakage of the motive fluid is induced or rendered liable. It has also been proposed, although not in motor vehicle or similar work to my knowledge, to accomplish the end desired, that is, to permit the engine shaft to continuously rotate without imparting motion to the parts directly driven thereby, by providing a variable throw crank or eccentric and longitudinally movable means for moving said eccentric to more or less eccentric or concentric positions relative to the driving shaft, so that when the eccentric is in true concentric relation to the shaft no motion will be imparted to the pitmen operatively connected to the eccentric, and it is with this last type of mechanism that my present invention deals.

The invention has for its primary object a variable throw crank or eccentric mechanism embodying an improved construction, arrangement, and disposition of bearings for the drive shaft, whereby the springing of the shaft between its bearings in the ends or bonnets of the crank or eccentric case is precluded, and all end thrust of the pitmen on the shaft is practically relieved or withstood, and the invention also has for one of its main objects an apparatus of this character in which stable and relatively rigid constant bearings are provided for the eccentric shifting elements of the mechanism.

The invention also has for one of its main objects to provide bearings for the eccentric shifting element that are approximately in direct line with the portion of the shaft which transmits the thrust to the pitmen, the shaft being thereby protected against liability to become sprung and the roller or other anti-friction bearings that are preferably interposed between the bearing rings and eccentric case and between the eccentric and its strap, reducing friction to a minimum and thereby increasing the efficiency of the transmission mechanism as well as the longevity thereof. And the invention also has for its object to simplify and otherwise generally improve this type of mechanism and to render apparatus of this character more commercially desirable.

With these and other objects in view as will more fully appear as the description proceeds, the invention consists in certain constructions, arrangements and combinations of the parts that I shall hereinafter fully describe and claim.

For a full understanding of the invention reference is to be had to the following description and accompanying drawing in which:

Figure 1 is a sectional view, partly in elevation, of my improvements; Fig. 2 illustrates in perspective the eccentric shifting mechanism, the eccentric or driving element, and one of the bearing rings, two of which are employed; and Fig. 3 is a view in the nature of a diagram, taken at right angle to Fig. 1 and indicating the parts as they would appear were a section to be taken through the plane of the eccentric or driving element of the apparatus.

Corresponding and like parts are referred to in the following description and indicated in all the views of the accompanying drawing by the same reference characters.

Referring to the drawing, the numeral 1 designates a drive shaft, such as the shaft of an internal combustion engine, and 2 designates pump cylinders of which there may be any number, say five, disposed radially around the shaft 1, each of said cylinders containing a reciprocating piston 3, of any desired construction or design, said pistons being connected respectively to pitmen 4 that are operatively connected to the eccentric or driving element 5. The element 5 is in the present instance connected to the pitmen 4 by an eccentric strap 6, as best indicated in Fig. 1, and anti-friction bearings 7 (roller bearings in the present instance) are interposed between the strap and the eccentric or driving element 5, as indicated in Figs. 1 and 3. The eccentric 5 is formed with an eccentrically disposed cruciform opening 8 in and through which there works a shifting element 9 in the form of a longitudinally elongated block the body portion of which is substantially rectangular in the present instance, said blocks being formed with oppositely disposed longitudinally extending cams 9ª formed with inclined edges 10 parallel to each other and preferably terminating in oppositely disposed parallel shoulders 11 and 12 respectively. The cams 9ª of the eccentric shifting element 9 ride upon the inclined walls of the oppositely disposed recesses 13 of the opening 8; while the side faces of the element 9 move continuously in engagement with the opposite side walls 14 of the opening 8, and the shoulders 9ᵇ that are formed by the extensions of the cams along the median line of the movement of the body portion of the element or block bear upon the shoulders 14ª that are produced between the recesses 13 and the side walls 14, the bearing surfaces being thereby evenly distributed.

Where the shaft 1 enters and leaves the eccentric case, it is journaled in bearings 15 that are carried by or formed with the bonnets or other extensions 16 that are of necessity included with the crank or eccentric case, in order to provide space for the movement of the shifting element 9, said bonnets being secured to the main or body portion of the case by bolts 17 or similar fastening devices. It is evident that the extent of shaft between the bearings 15 is a relatively long one and that without means to prevent it, the end thrust, transversely of the shaft, midway of these bearings, imposed on the shaft by the working of the eccentric or driving element 5 transmitted to the pitmen 4 and thence to the pistons, would have a tendency to spring the shaft. To positively prevent this and to relieve and withstand such end thrust as well as to provide bearings for the eccentric 5 as against any displacement thereof longitudinally of the shaft 1, I have provided bearing rings 18 disposed against the opposite side faces of the eccentric 5, each of said bearing rings being formed with a concentrically positioned cruciform opening 19 through which the shifting element 9 passes.

In the present embodiment of the invention, the main part of the opening 19 conforms in shape and area to the main body portion of the element 9, and preferably, although I do not regard this as essential, each opening 19 is formed with one beveled wall 20 and an opposite wall 21 parallel with the shaft 1, designed to be engaged by one of the shoulders 11 and a portion of one of the cam edges 10 when the eccentric shifting element 9 is at either limit of its longitudinal movement, this being clearly illustrated in Fig. 1.

It is of course to be understood that the element 9 is splined on the driving shaft 1 and that it may be moved longitudinally of said shaft by any desired means.

In the present embodiment of the mechanism a shifting sleeve 22 is secured to the element or block 9, said sleeve passing out through the adjoining bearing 15 and being provided with a grooved collar 23 designed for engagement by a yoke 24 formed on a shipper lever or similar part.

From the foregoing description, in connection with the accompanying drawing, the operation of my improved variable throw eccentric mechanism will be apparent. In the position of the parts illustrated in Fig. 1, it will be noted that the distance from the center of the shaft 1 to all points of the rim or periphery of the eccentric 5 is the same, whereby the rotation of the driving shaft will impart no reciprocating or gyratory movement whatever to the eccentric, and consequently no movement will be transmitted to the pitmen 4 and through them to the pistons 3 of the pump cylinders 2. Consequently, the shaft 1 may be permitted to continuously rotate, but the pumps will remain inoperative. Any movement of the eccentric shifting element 9 longitudinally of the shaft 1 to the left from the position viewed in Fig. 1 will, as is manifest, move the eccentric 5 in a plane at right angles to the axis of the shaft 1, whereby said eccentric or driving element 5 may be caused to assume a more or less eccentric relation to the shaft and consequently impart a greater or less amount of reciprocating movement to the pistons 3, so that the amount of work done by the pumps may be varied as desired within a wide range within the limits of which they are capable. At the greatest throw of the eccentric, the element 9 will have been moved over to the left until the lowermost shoulder 11 moves into contact with the lowermost recess (21) of the right hand bearing ring 18, the lower recess (20) of the left hand ring 18 being at the same time engaged by an adjoining portion of the lowermost cam edge 10.

It will thus be seen that I have provided a very simple, durable and efficient construction of mechanism for imparting a variable throw to an eccentric and that the construction and arrangement of the parts, particularly the bearing rings 18 that are approximately in line with the walls of the castings, forgings, or similar supporting structure for the cylinders, not only rigidly support the driving shaft 1 for its rotary movement at a point where the greatest strain is imposed upon the shaft, but also hold the eccentric 5 properly in position as against displacement along the axial line of the shaft. Furthermore the construction and arrangement of such rings and the eccentric and eccentric-shifting element provides for an even and well distributed bearing surface, which, particularly in connection with the anti-friction bearings, reduces friction to a minimum and protects the parts from end thrust to which they are naturally subjected in use.

While the present embodiment of the invention is described as being particularly designed for use in connection with hydraulic transmission mechanism for automobiles or the like, it is to be clearly understood that the invention is not limited thereto and that various changes may be made in construction, arrangement and proportions of the parts herein shown and described without departing from the scope of the invention as defined by the appended claims.

Having thus described the invention, what is claimed as new is:

1. In mechanism of the type described, the combination of a casing, a drive shaft journaled in the ends of the casing, an eccentric surrounding said shaft and formed with an opening inclosing said shaft, an eccentric-shifting element mounted for longitudinal movement on said shaft but turning therewith and disposed within the opening of the eccentric and engaging the walls thereof whereby to shift the eccentric at right angles to the axis of the shaft, means for moving said element longitudinally, and independent bearing elements disposed at each side of said eccentric and having peripheral rolling engagement with the casing, the casing having portions engaging the outer side faces of said elements to prevent movement of the same and the eccentric longitudinally of the shaft.

2. In mechanism of the type described, a drive shaft, an eccentric case provided with extensions in line with the shaft and in which the shaft is journaled, the extensions being provided with end bearings for this purpose, an eccentric surrounding said shaft, an eccentric shifting element movable longitudinally on the shaft within the case extensions but compelled to turn with the shaft, said element passing through the eccentric, bearing rings mounted in the case approximately in line therewith and through which the eccentric shifting element also passes and has bearing, and anti-friction bearings interposed between the case and said rings.

3. In mechanism of the type described, a drive shaft, an eccentric case provided with extensions in line with the shaft and in which the shaft is journaled, the extensions being provided with end bearings for this purpose, an eccentric surrounding said shaft, an eccentric shifting element movable longitudinally on the shaft within the case extensions but compelled to turn with the shaft, said element passing through the eccentric, bearing rings mounted in the case approximately in line therewith and through which the eccentric shifting element also passes and has bearing, anti-friction bearings interposed between said case and the rings, and other bearings surrounding said eccentric.

4. In mechanism of the type described, a drive shaft, an eccentric having a cruciform opening surrounding the shaft, an eccentric shifting block splined on said shaft, said block being cruciform in cross section and working through said opening, a case in which the shaft is journaled, bearing rings mounted in said case in line therewith and on opposite sides of said eccentric, said bearing rings being also formed with cruciform openings through which the block extends, said bearing rings having rolling engagement with the case and means for moving said block longitudinally of the shaft.

5. In mechanism of the type described, a drive shaft, an eccentric mounted upon the said drive shaft but shiftable in a plane at right angles thereto, an eccentric shifting element longitudinally movable on said shaft but turning therewith whereby to shift the eccentric at right angles to the shaft, bearing rings disposed around the eccentric shifting element and at each side of the eccentric, and an inclosing case having a body portion surrounding the rings and the lateral side walls of said body portion bearing against the rings, said case also including laterally extending reduced portions having shaft bearings at their ends.

6. In mechanism of the type described, a drive shaft, an eccentric loosely mounted on the shaft for movement in a plane at right angles thereto, an eccentric shifting element surrounding the shaft and movable through the eccentric whereby to shift the eccentric at right angles to the shaft when the shifting element is moved longitudinally of the shaft, the eccentric being formed with a cruciform opening and the eccentric shifting element being cruciform in cross section, a casing having bearings at its ends for the shaft and having a relatively large middle portion inclosing the eccentric, and bearing rings disposed one at each side of the eccentric and larger in diameter than the eccentric and bearing against the side walls of the enlarged portion of the casing, each bearing ring having a cruciform opening through which the cruciform eccentric shifting element passes.

7. In mechanism of the type described, a drive shaft, an eccentric case having an enlarged middle portion and reduced extensions in line with the shaft and in which the shaft is journaled, an eccentric loosely surrounding the shaft, an eccentric shifting element movable longitudinally on the shaft but turning therewith, said element passing through the eccentric and bearing rings mounted in the middle portion of the case and bearing against the side walls thereof, said rings having a greater diameter than the eccentric, said rings having each a central opening large enough to permit the free passage of the eccentric shifting element.

8. In mechanism of the type described, a drive shaft, an eccentric mounted upon the drive shaft but shiftable in a plane at right angles thereto, an eccentric shifting element longitudinally movable on said shaft but turning therewith, said shifting element having opposed parallel cam faces inclined to the axis of the shaft and terminating at each end in flat portions extending parallel to the shaft, independent bearing rings disposed around the eccentric shifting element and on each side of the eccentric, each of said bearing rings having a slot through which the shifting element passes, one end wall of said slot being inclined coincidentally with the inclination of the cam faces, the other end wall being parallel to said shaft, a casing surrounding the peripheries of the bearing rings and with which the bearing rings have peripheral rolling engagement, and means for shifting the eccentric shifting element from a position where the flat end face of one cam will bear against the flat end face of one of the bearing rings to a position where the opposite flat end face of the opposite cam will bear against the flat end face of the other bearing ring.

In testimony whereof, I affix my signature in presence of two witnesses.

CHARLES CLAYTON RICH. [L. S.]

Witnesses:
W. N. WOODSON,
FREDERICK S. STITT.